United States Patent
Mayer et al.

(10) Patent No.: US 11,642,736 B2
(45) Date of Patent: May 9, 2023

(54) METHOD FOR SCANNING THE SURFACE OF METAL WORKPIECES

(71) Applicant: Fronius International GmbH, Pettenbach (AT)

(72) Inventors: Manuel Mayer, Pettenbach (AT); Andreas Waldhoer, Pettenbach (AT); Manuel Binder, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/777,408

(22) PCT Filed: Nov. 17, 2020

(86) PCT No.: PCT/EP2020/082327
§ 371 (c)(1),
(2) Date: May 17, 2022

(87) PCT Pub. No.: WO2021/099287
PCT Pub. Date: May 27, 2021

(65) Prior Publication Data
US 2022/0402061 A1    Dec. 22, 2022

(30) Foreign Application Priority Data

Nov. 18, 2019  (EP) .................... 19209712

(51) Int. Cl.
*B23K 9/095* (2006.01)
*B23K 9/12* (2006.01)
*B23K 9/32* (2006.01)

(52) U.S. Cl.
CPC .............. *B23K 9/095* (2013.01); *B23K 9/125* (2013.01); *B23K 9/328* (2013.01)

(58) Field of Classification Search
CPC .. C08F 136/06; C08F 236/06; C08F 2410/01; C08F 36/06; C08F 4/52; C08F 4/545;
(Continued)

(56) References Cited

U.S. PATENT DOCUMENTS 6,087,627 A * 7/2000 Kramer ................ B23K 9/095
219/130.21
8,389,900 B2   3/2013 Artelsmair et al.
(Continued)

FOREIGN PATENT DOCUMENTS

CA      2796499 A1 * 11/2011 ......... B23K 26/0604
CN    104526171 A      4/2015
(Continued)

OTHER PUBLICATIONS

Indian Office Action dated Oct. 21, 2022 in Indian application No. 202217031380.
(Continued)

*Primary Examiner* — Nathaniel E Wiehe
*Assistant Examiner* — Ket D Dang
(74) *Attorney, Agent, or Firm* — Collard & Roe, P.C.

(57) ABSTRACT

In a method for scanning the surface of metallic workpieces, during scanning, a welding torch with a consumable welding wire is moved over and towards the workpiece surface, until contact of the welding wire with the workpiece is detected, and the welding wire is subsequently moved away from the workpiece. Before scanning, slag-removal is carried out to remove slag at the welding wire end, wherein the welding current is lowered to a minimum, and the welding wire is moved cyclically with a rapid recurrent forward/backward movement over a specified path length toward the workpiece, and by a smaller distance away from the workpiece, until a short circuit between the welding wire and the workpiece is detected, whereupon slag-removal is ended,
(Continued)

and upon the detection of no short circuit, slag-removal is repeated, and upon the detection of several short circuits one after the other, slag-removal is ended.

13 Claims, 5 Drawing Sheets

(58) Field of Classification Search
CPC ...... B23K 9/095; B23K 9/125; B23K 9/1278; B23K 9/235; B23K 9/328; B23K 9/0953; C12Q 1/6886; C12Q 2600/112; C12Q 2600/154
USPC .................................................... 219/130.01
See application file for complete search history.

(56) References Cited

U.S. PATENT DOCUMENTS

| | | | | |
|---|---|---|---|---|
| 2009/0242534 | A1* | 10/2009 | Artelsmair | B23K 9/0737 219/137.71 |
| 2017/0320277 | A1 | 11/2017 | Wang | |
| 2020/0139474 | A1 | 5/2020 | Mayer et al. | |

FOREIGN PATENT DOCUMENTS

| | | | | |
|---|---|---|---|---|
| EP | 2 007 542 | B1 | 4/2010 | |
| EP | 2576120 | B1 * | 2/2019 | ............ B23K 9/125 |
| JP | H04-143074 | A | 5/1992 | |
| JP | 2009533222 | A | 9/2009 | |
| JP | 2011036897 | A | 2/2011 | |
| JP | 2017-100179 | A | 6/2017 | |
| JP | 2017100179 | A | 6/2017 | |
| WO | 2007/115342 | A1 | 10/2007 | |
| WO | 2014196283 | A1 | 12/2014 | |
| WO | 2019/002141 | A1 | 1/2019 | |
| WO | 2019002141 | A1 | 1/2019 | |

OTHER PUBLICATIONS

Chinese Office Action dated Sep. 27, 2022 in Chinese application No. 202080085580.2 with English translation.
European Search Report in 19209712.9-1016, dated Jun. 2, 2022, with English translation of relevant parts.
English translation of Preliminary Report on Patentability in PCT/EP2020/082327, dated May 27, 2022.
International Search Report in PCT/EP2020/082327, dated Mar. 18, 2021.
Japanese Office Action dated Nov. 8, 2022 in Japanese Application 2022-528709 with English Summary.

* cited by examiner

METHOD FOR SCANNING THE SURFACE OF METAL WORKPIECES

CROSS REFERENCE TO RELATED APPLICATIONS

This application is the National Stage of PCT/EP2020/082327 filed on Nov. 17, 2020, which claims priority under 35 U.S.C. § 119 of European Application No. 19209712.9 filed on Nov. 18, 2019, the disclosure of which is incorporated by reference. The international application under PCT article 21(2) was not published in English.

The invention relates to a method for scanning the surface of metallic workpieces, wherein, during a scanning process, a welding torch with a consumable welding wire is moved over the surface of the workpiece, and the welding wire is moved towards the surface of the workpiece at specified points in time at a forward speed, until contact of the welding wire with the workpiece is detected by a welding current source, and the welding wire is subsequently moved away from the workpiece again at a backward speed.

Before a welding process, the welding wire of a welding device can be used to scan the surface of the workpieces, which are to be machined, in that the welding wire is used as sensor, in that it is moved in the direction of the workpiece at specified points in time, until the welding wire contacts the workpiece and forms a short circuit. The welding wire is subsequently moved away from the workpiece again. The position of the welding wire during contact with the workpiece, and thus the position of the surface of the workpiece can be inferred via the movements of the welding wire, which are detected by means of rotary encoders in the feed device.

For example, WO 2019/002141 A1 describes a method and a device for scanning a surface of a metallic workpiece with the help of the welding wire of the welding torch. During the scanning process in response to each short circuit of the welding wire with the metallic workpiece, a position value is thereby determined and stored or output, respectively, which can be used by the manipulator to detect an edge or a certain position.

After a welding process, slag or silicates, respectively, can deposit on the welding wire (in particular in the case of steel alloys), which have an insulating effect. This insulating layer at the free end of the welding wire can block the scanning process with the help of the welding wire because no short circuit is detected in the case of contact of the welding wire with the workpiece.

It is known to remove possible slag at the end of the welding wire before a welding process in order to ensure a safe igniting of an electric arc. A slag-removal process can be used for this purpose before the welding method, wherein the welding current is lowered to a minimum, and the welding wire is moved cyclically with a rapid recurrent forward/backward movement over a specified path length in the direction of the workpiece, and by a smaller distance away from the workpiece again, until a short circuit between the welding wire and the workpiece is detected by means of a short circuit monitoring, whereupon the slag-removal process is ended. Such a method is described in EP 2 007 542 B1.

It is the object of the present invention to improve an above-mentioned scanning method to the effect that a reliable detection of a short circuit is ensured in the case of contact of the welding wire with the metallic workpiece. The scanning method is to thus be capable of being carried out as rapidly as possible and without interruption. Disadvantages of known methods are to be avoided or at least reduced.

The object is solved by means of an above-mentioned scanning method, wherein, before the scanning process, a slag-removal process is carried out to remove slag at the end of the welding wire, wherein at the start of the slag-removal process, the welding current is lowered to a minimum, and the welding wire is moved cyclically with a rapid recurrent forward/backward movement over a specified path length in the direction of the workpiece, and by a smaller distance away from the workpiece again, so that the conveyance of the welding wire to the workpiece prevails, until a short circuit between the welding wire and the workpiece is detected, whereupon the slag-removal process is ended, and upon the detection of no short circuit between the welding wire and the workpiece, the slag-removal process is repeated, and upon the detection of several short circuits between the welding wire and the workpiece one after the other, the slag-removal process is ended. According to the invention, it is thus provided that, before the scanning process, a slag-removal process is carried out to ensure that slag, which may be present at the free end of the welding wire, can be removed, and a safe scanning of the surface of the workpiece is thus possible by means of the welding wire. Due to the repeated impact of the welding wire on the workpiece surface during the slag-removal process, the slag at the free end of the welding wire is generally removed, and the short circuit detection during the subsequent scanning process is ensured. When detecting no short circuit between the welding wire and the workpiece, the slag-removal process is repeated. A safe removal of the slag from the welding wire and then an error-free scanning process is thus ensured. When detecting several short circuits between the welding wire and the workpiece one after the other, the slag-removal process is ended. By counting consecutive short circuits during the slag-removal process, a further securing for verifying the complete removal of the slag from the welding wire is realized. Only after exceeding this defined number of short circuits can it be assumed that the slag was safely removed, and the slag-removal process can be ended.

The slag-removal process is advantageously ended when detecting five short circuits between the welding wire and the workpiece one after the other. After exceeding five short circuits, it can be assumed that the slag was safely removed, and the slag-removal process can be ended.

The slag-removal process can be started when detecting no short circuit between the welding wire and the workpiece during a defined period of time before the scanning process. This represents a condition for the initiation of a slag-removal process before the scanning process, in order to ensure a perfect functionality.

The slag-removal process can further be started when the wire feed speed sinks below a specified threshold value when moving the welding wire at a specified wire feed speed in the direction of the workpiece before the scanning process. This drop in the wire feed speed below a specified threshold value in the start phase before the scanning process is an indication that a slag is located on the welding wire. When falling below the specified threshold value of the wire feed speed, the slag-removal process is thus triggered.

Before measuring whether the wire feed speed falls below the specified threshold value, a specified time period is thereby preferably awaited. By adhering to certain time targets, it is ensured that tuning processes have abated and that the slag-removal process is not triggered unintentionally.

As further condition for the start of the slag-removal process, the exceeding of the force on the welding wire can be defined via a specified maximum value. If the welding wire is moved in the direction of the workpiece when starting a scanning process, and if slag is present on the welding wire, a measurable increase in force occurs due to the insulating effect of the slag upon longer impact of the welding wire on the workpiece. This increase in force can be detected relatively easily via the motor current of the motors of a wire feed device and can be used as requirement for triggering the slag-removal process. Due to the combination of one of the above-mentioned conditions, in particular the drop in the wire feed speed at the start of the scanning process with the force measurement, the presence of slag on the welding wire can be detected even more reliably, and erroneous triggering of the slag-removal process can be avoided.

Finally, it is also possible that the slag-removal process is started when exceeding a specified maximum value of the force on the welding wire. The exceeding of a specified certain increase in force also represents an expedient condition for triggering the slag-removal process before a scanning process.

The slag-removal process can also be started when lowering the wire feed speed during the scanning process below a specified threshold value. This also represents a further condition for triggering the slag-removal process. The threshold value of the wire feed speed during the scanning process generally differs from the above-mentioned threshold value for the wire feed speed in the start phase of the scanning process.

According to a further feature of the invention, the slag-removal process is started when exceeding a specified maximum value of the force on the welding wire during the scanning process. As at the start of the scanning process, the exceeding of a maximum force on the welding wire or the exceeding of a maximum increase in force over time on the welding wire can also be an indication during the scanning process for the presence of slag on the welding wire, which justifies or necessitates, respectively, the triggering of a slag-removal process even during the scanning process. The forces on the welding wire can be detected via the motor current of the motor of the wire feed device.

When the angle of attack of the welding torch to the surface of the workpiece is determined, and when the slag-removal process is deactivated when falling below a specified threshold value of the angle of attack, the performance of an inefficient slag-removal process can be prevented. If the welding torch and thus the welding wire is in fact oriented too flat to the workpiece, the slag cannot be removed or cannot be removed sufficiently from the welding wire by means of a deflection or bending of the welding wire.

An error message can be output when detecting no stable short circuit between welding wire and workpiece after several repetitions of the slag-removal process, in particular after 15 repetitions. It can be displayed to the welder by means of the error message that the slag could not be removed from the welding wire with the help of the slag-removal process and that other measures are necessary.

As a measure, the end of the welding wire can, for example, be cut off in a cutting device after outputting the error message. Even if previous slag-removal processes were unsuccessful, the welding wire can be prepared for a scanning process again in this way.

The present invention will be described in more detail on the basis of the enclosed drawings. Shown are.

Figure 1:
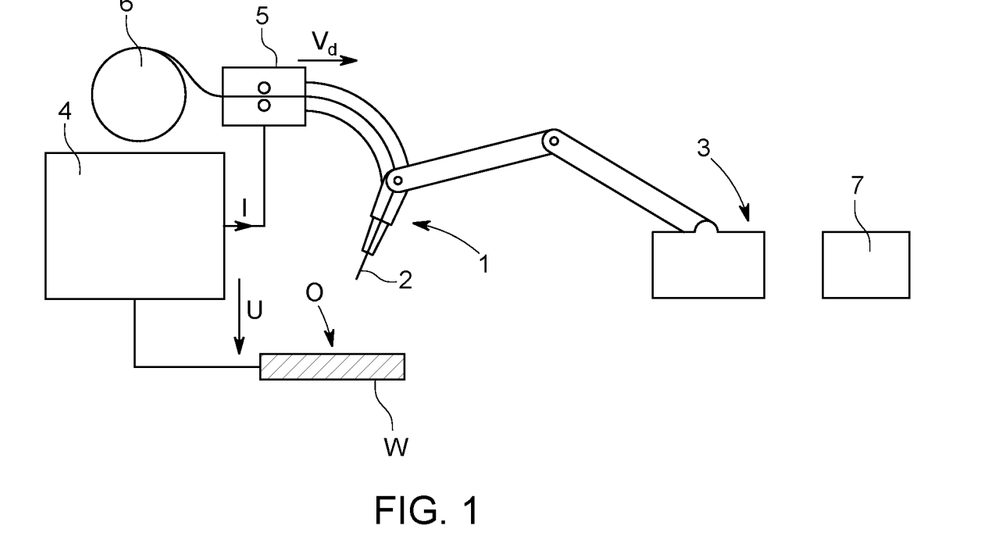
FIG. 1 a schematic diagram of a welding device for carrying out a welding process and scanning process.

FIG. 1 shows a schematic diagram of a welding device for carrying out a welding process and scanning process AP. A welding torch 1 with a welding wire 2 is connected to a corresponding manipulator 3, for example a welding robot. A welding current source 4 supplies the welding torch 1 or the welding wire 2, respectively, with the welding current I and the welding voltage U. The welding wire 2 is conveyed at a feed speed $v_d$ from a wire roll 6 to the welding torch 1 via a feed device 5. During the scanning process AP, the welding torch 1 with the welding wire 2 is moved along a specified path and at a specified speed over the surface O of the workpiece W with the help of the manipulator 3. At specified points in time, the welding wire 2 is moved at a forward speed $v_{SV}$ to the surface O of the workpieces W, until the welding current source 4 detects contact of the welding wire 2 with one of the workpieces W. The welding wire 2 is subsequently moved away from the workpieces W again at a backward speed $v_{SR}$. The position of the surface O of the workpieces W is determined and stored at each of the points in time in the welding current source 4. To remove possible slag from the free end of the welding wire 2, a slag-removal process SE can be carried out, wherein the welding current I is lowered to a minimum, and the welding wire 2 is moved cyclically with a rapid recurrent forward/backward movement over a specified path length in the direction of the workpiece W, and by a smaller distance away from the workpiece W again, so that the conveyance of the welding wire 2 to the workpiece W prevails, until a short circuit between the welding wire 2 and the workpiece W is detected. If the slag cannot be removed from the welding wire 2 during the slag-removal process SE even after several repetitions, it may be necessary to cut off the end of the welding wire 2 manually or in a cutting device 7, and to thus free it from the slag. The manipulation of the welding torch 1 to the cutting device 7 can also be carried out fully automatically by means of the manipulator 3, in particular welding robot.

Figure 2:
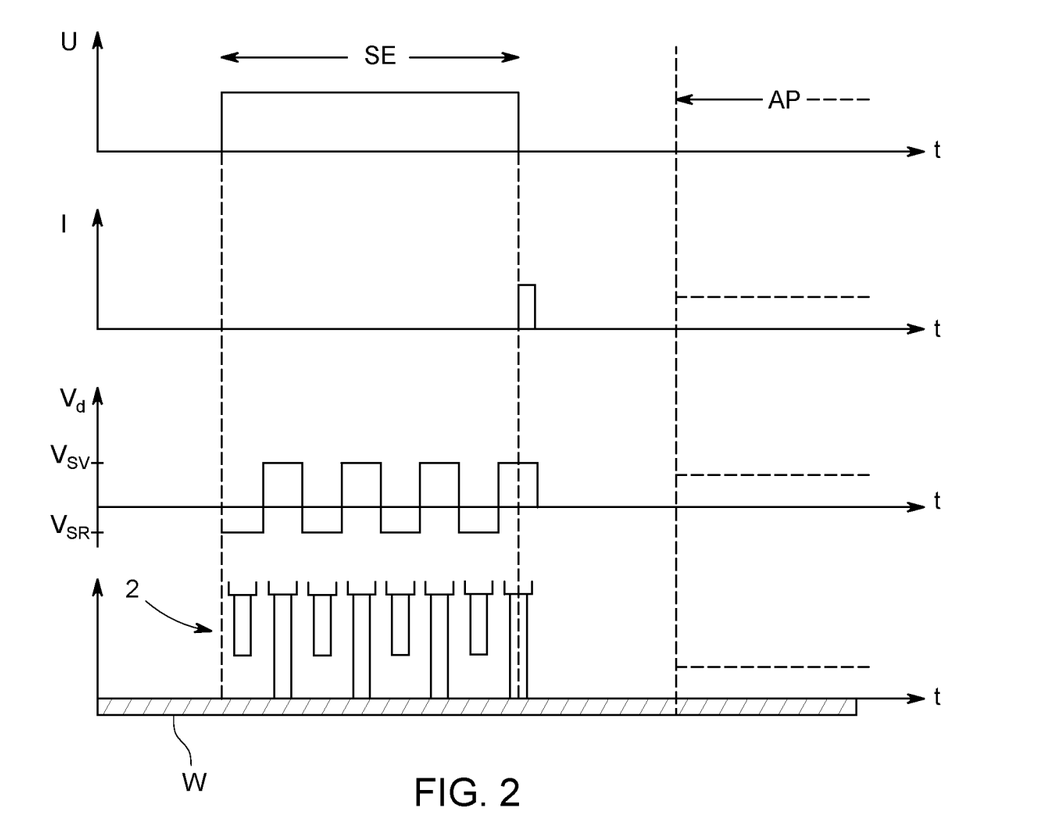
FIG. 2 the time courses of the welding voltage, of the welding current, and of the feed speed of the welding wire and of a movement diagram of the welding wire during a slag-removal process in a schematic manner.

FIG. 2 shows the courses of the welding voltage U, of the welding current I, of the feed speed $v_d$ of the welding wire 2, and of a movement diagram of the welding wire 2 relative to the workpiece W during a slag-removal process SE in a schematic manner. To prevent that a scanning process AP cannot be carried out or cannot be carried out correctly due to a slag adhering to the welding wire 2, a slag-removal process SE takes place beforehand, if necessary. The welding wire 2 is thereby not continuously conveyed to the workpiece W by means of the slag-removal process SE, but is moved forward, thus to the workpiece W, and back again, thus removed from the workpiece W, at a certain frequency. The welding wire 2 is thereby moved forward over a certain distance at a relatively high speed $v_d$, and is conveyed back again by a distance smaller than forward, so that the conveyance of the welding wire 2 to the workpiece W prevails. The frequency, at which the forward/backward movement of the welding wire 2 is carried out, is thereby preferably between 50 Hz and 150 Hz. It goes without saying that it is also possible to use lower or higher frequencies for the slag-removal process SE. It should thereby generally be ensured that the frequency also defines the duration for the slag-removal process SE. This is why in particular higher frequencies are significant because the duration is thus shortened. The welding wire 2 is conveyed with a rapid recurrent forward/backward movement, for example at a set frequency of 75 Hz, until contact with the workpiece W. If slag is present on the welding wire 2, no short circuit KS between welding wire 2 and workpiece W can be detected or can be detected by a control device of the current source 4 or of a short circuit monitoring, respectively. The welding wire 2 is further moved backward and forward again recurrently according to the set frequency. Finally, the slag is released from the end of the welding wire 2, and the current source 4 can detect a short circuit KS due to an increase of the current I or drop in voltage U, respectively. The slag-removal process SE can subsequently be ended. The current I during the slag-removal process SE is usually limited, for example to maximally 3 A, so that a burning off of the welding wire 2 can be prevented.

Figure 3:
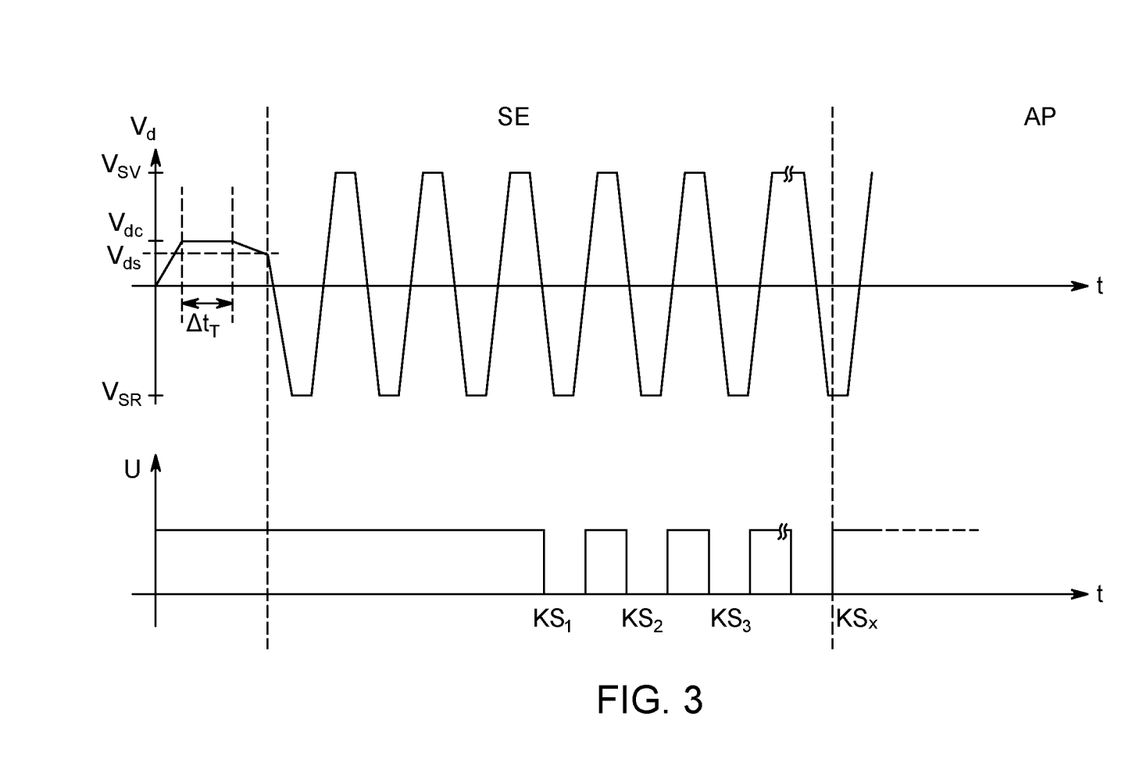
FIG. 3 the time courses of the wire feed speed and of the voltage in a schematic manner in the case of an exemplary embodiment of the slag-removal process.

FIG. 3 shows the time courses of the wire feed speed $v_d$ and of the voltage U in a schematic manner in the case of an exemplary embodiment of the slag-removal process SE. Before carrying out a scanning process AP, the welding torch 1 stands in a start position above the workpiece W. The welding wire 2 also stands several mm above the surface O of the workpiece W. Before the scanning process AP is now initiated, the welding wire 2 begins to move in the direction of the workpiece W at a specified feed speed $v_{dc}$. Until reaching the specified value of the feed speed $v_{dc}$, a transient response of the actual value of the wire feed speed occurs, which is why a certain specified time $\Delta t_T$ is preferably awaited, before the latest wire feed speed $v_d$ is measured. An unintentional triggering of the slag-removal process SE during these setting processes can thus be prevented. The slag-removal process SE is triggered when the latest wire feed speed $v_d$ has dropped below a specified threshold vas after the time $\Delta t_T$ has lapsed. This threshold value vas is only valid in the start phase. After activation of the slag-removal process SE, the welding wire 2 is moved with high acceleration and force F to the workpiece W and away from it. The welding wire 2 is initially still in the air, but approaches the surface O of the workpiece W more and more. The welding wire 2 subsequently "hammers" on the surface O of the workpiece W, and the slag adhering to the end of the welding wire 2 is thereby removed or this is at least attempted. To detect as reliably as possible in this way whether the slag was removed from the welding wire 2, the slag-removal process SE is stopped only when a defined number n, for example 5, of cyclical short circuits KS is detected. After this first phase of a slag-removal process SE, a switchover into the scanning phase AP takes place. If no short circuits at all should occur (because the welding wire 2 does in fact insulate), the slag-removal process SE continues to work until a termination is made by the operator or the robot control. However, a time restriction would also be conceivable here.

If a drop in the wire feed speed $v_d$ below a certain specified threshold occurs again after the slag-removal process SE ended, the slag-removal process SE can be triggered again (not illustrated).

Figure 4:
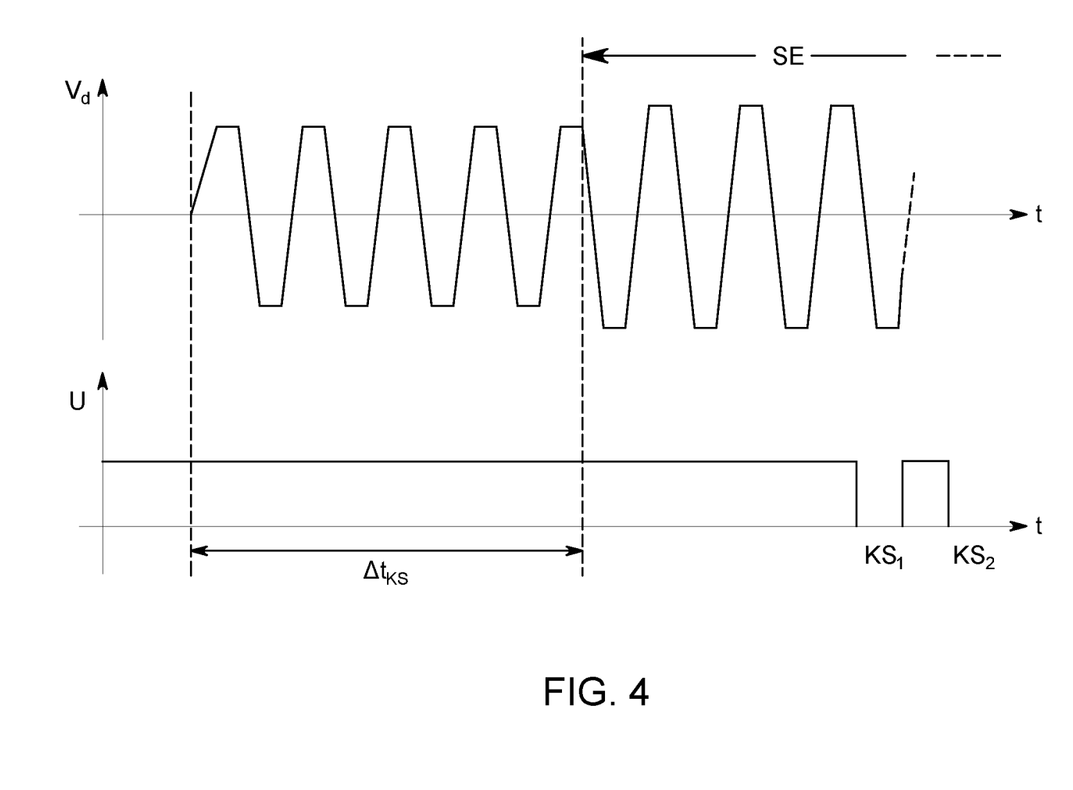
FIG. 4 the time courses of the wire feed speed and of the voltage in the case of an alternative triggering condition for the slag-removal process in a schematic manner.

FIG. 4 shows the time courses of the wire feed speed $v_d$ and of the voltage U in the case of an alternative triggering condition for the slag-removal process SE in a schematic manner. Before the use of a scanning process AP, the welding wire 2 is thereby moved to the workpiece W and away from the workpiece W again, and a slag-removal process SE is then started, when no short circuit KS between the welding wire 2 and the workpiece W is detected during a specified time span $\Delta t_{KS}$. In the illustrated example, no short circuit KS (drop in voltage) is detected during this specified time span $\Delta t_{KS}$, and the slag-removal process SE is thus started.

Figure 5:
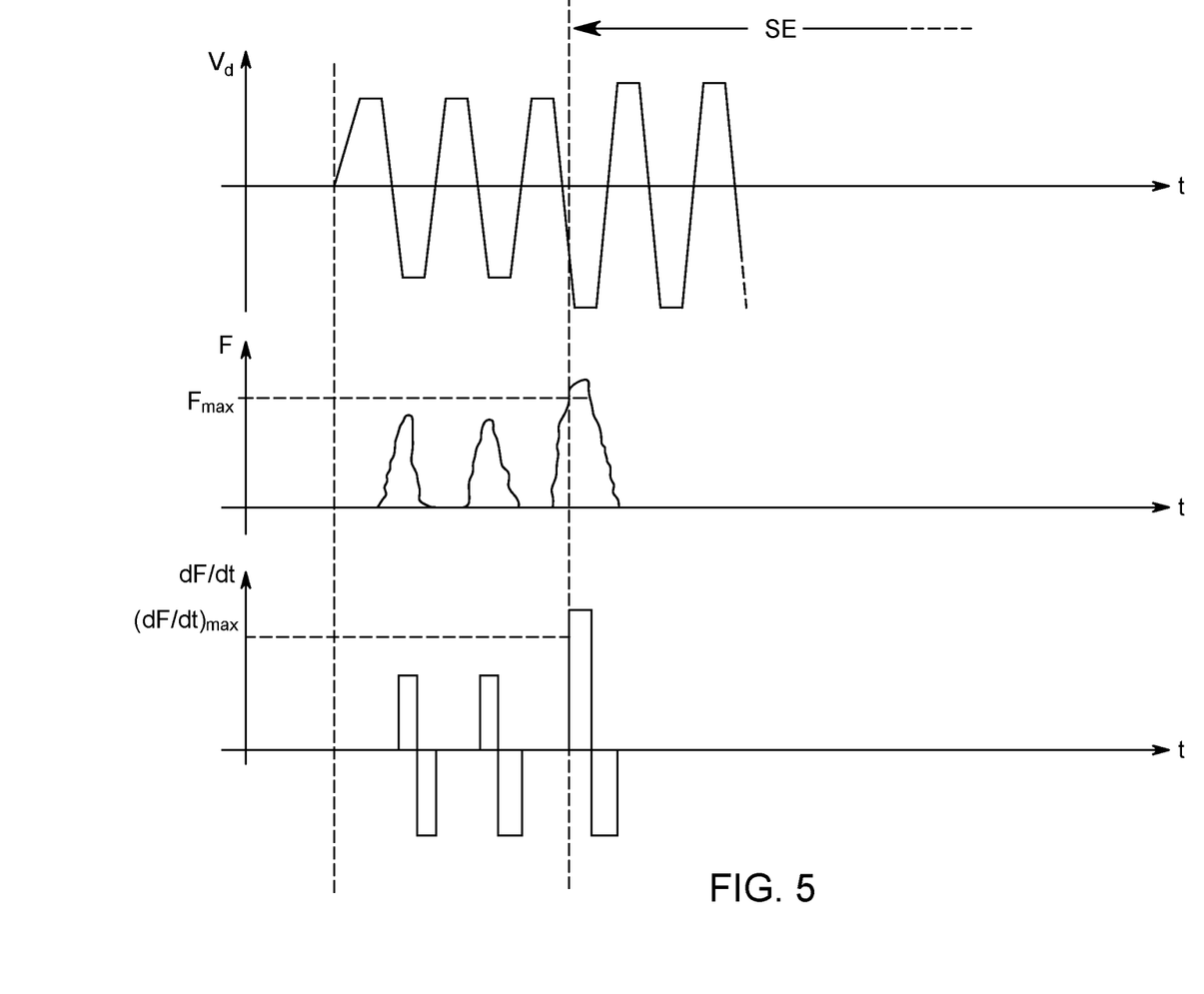
FIG. 5 the time courses of the wire feed speed, of the force on the welding wire, as well as of the change of the force over time on the welding wire in the case of a further triggering condition for the slag-removal process in a schematic manner.

FIG. 5 shows the time courses of the wire feed speed $v_d$, of the force F on the welding wire 2, as well as of the change of the force dF/dt over time on the welding wire 2 in the case of a further triggering condition for the slag-removal process SE in a schematic manner. It is pointed out that the course of the time derivation of the force in the lowermost diagram is illustrated in a highly simplified manner. The slag-removal process SE can then be triggered when the force F on the welding wire 2 increases above a specified maximum value $F_{max}$. In the alternative or in addition, the slag-removal process SE can also be started when a certain increase in force dF/dt exceeds a specified threshold $(dF/dt)_{max}$. These conditions of exceeding a maximum force $F_{max}$ on the welding wire 2 or of a maximum change in force $(dF/dt)_{max}$ over time on the welding wire can also be determined during the scanning process AP and not before the scanning process AP. The respective threshold values for the maximum force $F_{max}$ and the maximum force change $(dF/dt)_{max}$ over time are set according to experience, and it goes without saying that they can differ for the condition before the scanning process AP and during the scanning process.

Figure 6:
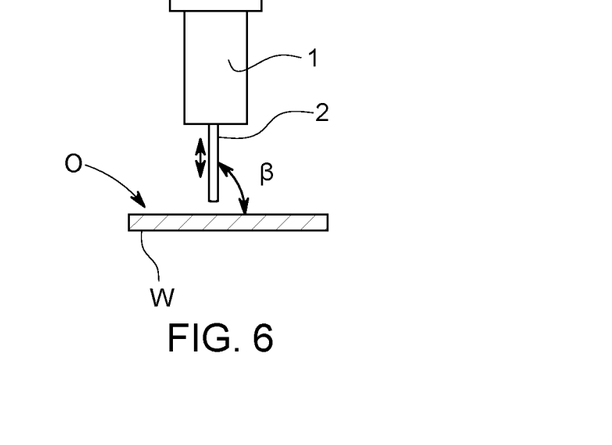
FIG. 6 a welding torch in an angular position to the workpiece, which is desired for a slag-removal process.

FIG. 6 shows a welding torch 1 in an angle β of approximately 90° to the surface O of the workpiece W, which is desired for a slag-removal process SE. This is a suitable angle β for the slag-removal process SE, because the welding wire 2 essentially impacts frontally on the surface O of the workpiece W here, and the likelihood of the removal of the slag from the end of the welding wire 2 is thus very high.

Figure 7:
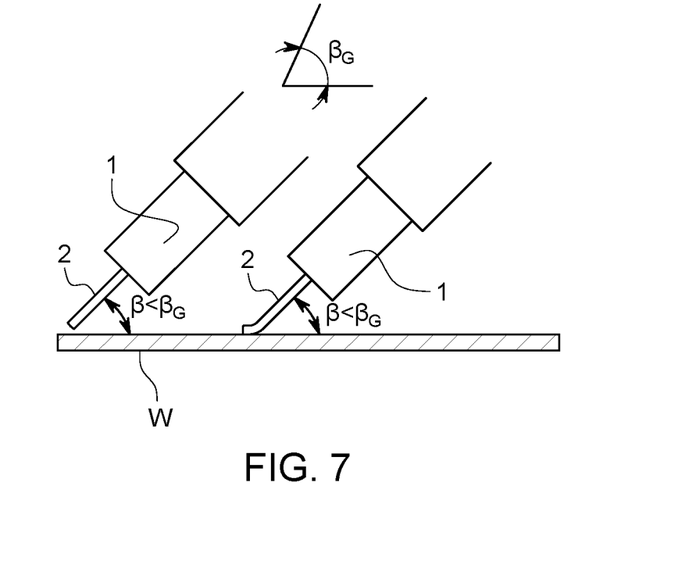
FIG. 7 a welding torch in an angular position to the workpiece, which is unsuitable for the slag-removal process.

A welding torch 1 in an angular position to the workpiece W, which is unsuitable for the slag-removal process SE, is outlined in FIG. 7. Here, the angle β of the welding torch 1 to the surface O of the workpiece W falls below a specified threshold value $β_G$ of, for example, 45°. In this case, the welding wire 2 or the end thereof, respectively, is bent or deflected, respectively, during the slag-removal process SE, and the removal of the slag cannot be ensured. When falling below the critical angle $β_G$ between welding torch 1 and welding wire 2, the slag-removal process SE can thus also be deactivated automatically because a slag removal cannot be ensured.

The position of the welding torch 1 could also be detected automatically by means of corresponding sensors, for example gyro sensors and, if need be, by means of a detection of a torch identification BID located in the welding torch 1 for the consideration of the torch geometry, and the angle β of the welding torch 1 or of the welding wire 2, respectively, to the surface O of the workpiece W could be calculated therefrom. The slag-removal process SE can then be detected automatically in the case of very flat attack angles of the welding torch 1, in order to rule out malfunctions and deformations of the welding wire 2. It goes without saying that an error message can thereby be output to the user or welder, respectively.

In the case of certain geometries of welding torches 1 or specific geometries with high friction, it would frequently be necessary to specifically adapt a plurality of the control parameters for the reliable triggering and functioning of the slag-removal process SE. This could also be carried out automatically by means of a torch identification BID located in the welding torch 1. The optimal control parameters of the slag-removal process SE would thus be available automatically for every type of the welding torch 1.

The invention claimed is:

1. A method for scanning a surface of a metallic workpiece, the method comprising the steps of:
   during a scanning process, moving a welding torch with a consumable welding wire over the surface of the metallic workpiece, and moving the consumable welding wire towards the surface of the metallic workpiece at specified points in time at a forward speed, until a contact of the consumable welding wire with the metallic workpiece is detected by a welding current source, and subsequently moving the consumable welding wire away from the metallic workpiece again at a backward speed,
   carrying out a slag-removal process to remove slag at an end of the consumable welding wire before the scanning process,
   at a start of the slag-removal process, lowering a welding current to a minimum, and cyclically moving the consumable welding wire with a rapid recurrent forward/backward movement over a specified path length in direction of the metallic workpiece, and by a smaller distance away from the metallic workpiece again, so that a conveyance of the consumable welding wire to the metallic workpiece prevails, and upon a detection of no short circuit between the consumable welding wire and the metallic workpiece, repeating the slag-removal process, and upon a detection of several short circuits between the consumable welding wire and the metallic workpiece one after another, ending the slag-removal process, and
   starting the slag-removal process when a wire feed speed sinks below a specified threshold value when moving the consumable welding wire at a specified wire feed speed in the direction of the metallic workpiece before the scanning process.

2. The method according to claim 1, further comprising the step of ending the slag-removal process five short circuits between the consumable welding wire and the metallic workpiece are detected one after another.

3. The method according to claim 1, further comprising the step of starting wherein the slag-removal process when no short circuit between the consumable welding wire and the metallic workpiece is detected during a defined time span before the scanning process.

4. The method according to claim 1, further comprising the step of awaiting a specified time period before measuring whether the wire feed speed falls below the specified threshold value.

5. The method according to claim 1, further comprising the step of starting the slag-removal process when a specified maximum value of a force on the consumable welding wire is exceeded.

6. The method according to claim 1, further comprising the step of starting the slag-removal process when a specified threshold value of a change of a force over time on the consumable welding wire is exceeded.

7. The method according to claim 1, further comprising the step of starting the slag-removal process when the wire feed speed sinks below a specified threshold value during the scanning process.

8. The method according to claim 1, further comprising the step of starting the slag-removal process when a specified maximum value of a force on the consumable welding wire is exceeded during the scanning process.

9. The method according to claim 1, further comprising the step of starting the slag-removal process when a specified threshold value of a change of a force on the consumable welding wire is exceeded during the scanning process.

10. The method according to claim 1, further comprising the steps of determining an angle of attack of the welding torch to the surface of the metallic workpiece, and the slag-removal process when falling below a specified threshold value of the angle of attack.

11. The method according to claim 1, further comprising the step of outputting an error message when no stable short circuit between the consumable welding wire and the metallic workpiece is detected after several repetitions of the slag-removal process.

12. The method according to claim 11, further comprising the step of cutting off an end of the consumable welding wire in a cutting device after outputting the error message.

13. The method according to claim 11, further comprising the step of outputting the error message when no stable short circuit between the consumable welding wire and the metallic workpiece is detected after 15 repetitions of the slag-removal process.

* * * * *